US008415452B1

(12) United States Patent
Rubenstein

(10) Patent No.: US 8,415,452 B1
(45) Date of Patent: Apr. 9, 2013

(54) HEXAVALENT CHROMIUM AND TOTAL CHROMIUM REMOVAL FROM POLYCHLORINATED VINYL CHLORIDE (PVC) POLYMERS

(75) Inventor: Mitchell Rubenstein, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/434,913

(22) Filed: Mar. 30, 2012

Related U.S. Application Data

(60) Provisional application No. 61/474,331, filed on Apr. 12, 2011.

(51) Int. Cl.
*C08G 64/00* (2006.01)
*C08G 63/02* (2006.01)

(52) U.S. Cl.
USPC .......................................................... 528/495

(58) Field of Classification Search .................... 528/495
See application file for complete search history.

(56) References Cited

U.S. PATENT DOCUMENTS 3,896,209 A 7/1975 Fournier et al.
2009/0014094 A1* 1/2009 Kuezynski et al. ............ 148/265

OTHER PUBLICATIONS

S.A. Katz, "The Analytical Biochemistry of Chromium", Environmental Health Perspectives, 1991, pp. 13-16, vol. 92.
W. Gaede et al., "Kinetics of the Oxidation of Chromium (II) by Hydrogen Peroxide. Effect of Different Anions, Temperature and Pressure", Inorganic Chemistry, 1994, pp. 2204-2208, vol. 33.
"Hexavalent Chromium by Ion Chromatography", NIOSH Manual of Analytical Methods (NMAM), Fourth Edition, Method 7605, Issue 1, Mar. 15, 2003.
"Test Methods for Evaluating Solid Waste", Physical/Chemical Methods, EPA Method 6020A, $3^{rd}$ Edition, Revision 1, Feb. 2007.
G. Du et al., "Oxidation of Vanadium (III) by Hydrogen Peroxide and the Oxomomoperoxo Vanadium (V) Ion in Acidic Aqueous Solutions: a Kinetics and Simulation Study", Inorganic Chemistry, Jul. 25, 2005, pp. 5514-5522, vol. 44(15).
M.R. Baloga et al., "The Kinetics of the Oxidation of Cr(III) to Cr(VI) by Hydrogen Peroxide", Journal American Chemical Society, 1961, pp. 4906-4909, vol. 83.

* cited by examiner

*Primary Examiner* — Terressa Boykin
(74) *Attorney, Agent, or Firm* — Bart Hersko; AFMCLO/JAZ

(57) ABSTRACT

A non-destructive process for removing chromium from polyvinyl chloride filters is disclosed. The process involves immersing the polyvinyl chloride filters in a concentrated hydrogen peroxide solution at elevated temperatures, followed by rinsing with deionized water. Removing the background concentration of chromium from the filters allows for more accurate measurements of the amount of hexavalent and total chromium present in workplace environments.

10 Claims, 2 Drawing Sheets

HEXAVALENT CHROMIUM AND TOTAL CHROMIUM REMOVAL FROM POLYCHLORINATED VINYL CHLORIDE (PVC) POLYMERS

CROSS REFERENCE TO RELATED APPLICATION

This application claims the benefit of and priority to the filing date of U.S. provisional application Ser. No. 61/474,331 filed Apr. 12, 2011, incorporated herein by reference in its entirety.

RIGHTS OF THE GOVERNMENT

The invention described herein may be manufactured and used by or for the Government of the United States for all governmental purposes without the payment of any royalty.

BACKGROUND OF THE INVENTION

The invention relates to removal of residual chromium from commercially produced polyvinyl chloride (PVC) membranes and films. This is important because occupation health professionals use this PVC film in disc form for the monitoring and analysis of hexavalent chromium and total chromium present in workplace environments Chromium metals and hexavalent chromium are known health hazards that need to be monitored in workplace environments. However, if chromium background is present in the filters, the interpretation of the results can be problematic. Thus, it would be desirable to remove the background concentration of chromium metals and hexavalent chromium that often times interferes with the analytical analysis methods ability to discern environmentally harvested chromium materials from PVC filter manufacturing byproducts.

M. R. Baloga and J. E. Earley, *The Kinetics of the Oxidation of Cr (III) to Cr (VI) by Hydrogen Peroxide*, J. Am. Chem. Soc. 83 4906-4909 (1961) observed that Cr (III) can be oxidized to Cr (VI) with hydrogen peroxide under alkaline conditions. Since that time other authors have examined the kinetics of the reaction. Additional literature illustrates pathways where Cr (VI) is reduced to Cr (III) under acidic conditions. Furthermore, there have been studies that have illustrated the effect of small organic molecules effect on the kinetics of the reaction. Additional articles examine the mechanism in the presence of small organic molecules.

However, there have been no previous references that describe the reaction under the influence of an organic polymer. Furthermore, as discussed above, previous literature indicates that the oxidation of Cr (III) to Cr (VI) requires alkaline modification of the solution. This alkaline modification can cause structural damage to the PVC filters and make them unsuitable for use.

A need exists for a non-destructive method of removing the background concentration of chromium metals and hexavalent chromium that is present in the PVC filters.

SUMMARY OF THE INVENTION

A process was developed to remove chromium including the hexavalent form (Cr-VI) of this element. Chromium metals and hexavalent chromium are known health hazards that need to be monitored in workplace environments. However, if chromium background is present in the filters, the interpretation of the results can be problematic. Thus, it would be desirable to remove the background concentration of chromium metals and hexavalent chromium that often times interferes with the analytical analysis methods ability to discern environmentally harvested chromium materials from PVC filter manufacturing byproducts.

The inventor has discovered that chromium can be converted to its hexavalent form in the absence of the addition of alkaline modification. Using only hydrogen peroxide and heat allows for a non-destructive process for cleaning the PVC filter of chromium contamination. Furthermore, the inventor's process requires little additional steps for the use of the material since there has not been any alkaline modification to the PVC filter.

The process developed by the inventor utilizes hydrogen peroxide at elevated temperatures to quantitatively remove all forms of chromium. Initial electron microscopy studies do not indicate any damage to the polyvinyl chloride membrane filter which appears to retain structural integrity.

The non-destructive process of the present invention for the removal of chromium from polyvinyl chloride (PVC) filters comprises the following steps.

The polyvinyl chloride membrane filters are immersed into a non-alkaline solution of concentrated hydrogen peroxide. The polyvinyl chloride membrane filters at 37 mm/5 µm discs are commercially available from a variety of sources, including SKC, Inc. and Millipore, Inc. The concentrated hydrogen peroxide solution is supplied at a concentration of approximately 30%, but may vary from about 20% by weight to about 40% by weight of hydrogen peroxide. No acidic or alkaline modification is made on the solution, leaving a non-alkaline solution. The concentrated hydrogen peroxide solution preferably has a pH between about 4.5 and about 5.0 (per US Peroxide). The solution of hydrogen peroxide is heated to a temperature from about 30 deg C. to not greater than 80 deg C. and the filters are individually added. The solution did not exceed the upper temperature of 80 deg C., so as to avoid possible heat-related damage to the polyvinyl chloride membrane filters. The filters are immersed into the heated non-alkaline solution of concentrated hydrogen peroxide for at least 10 minutes, preferably between about 10 to about 20 minutes. The filters are removed from the heated non-alkaline solution of concentrated hydrogen peroxide and rinsed with a deionized water solution at room temperature. Preferably, the filters are immersed into the deionized water solution. The rinsed filters are removed from the deionized water solution and dried, preferably within a particulate and contaminant free area to avoid picking up any unwanted particulates or contaminants.

Importantly, the process of the present invention can remove at least 80% and more typically, over 90% of the chromium originally present in the polyvinyl chloride filters in a single treatment.

DETAILED DESCRIPTION

The non-destructive process of the present invention for the removal of chromium from polyvinyl chloride filters comprises the following steps:

The polyvinyl chloride membrane filters are immersed into a non-alkaline solution of concentrated hydrogen peroxide. The polyvinyl chloride membrane filters at 37 mm/5 μm discs are commercially available from a variety of sources, including SKC, Inc. and Millipore, Inc., both of which are supplied by Fischer Scientific, 300 Industry Drive, Pittsburgh, Pa. 15275. The concentrated hydrogen peroxide solution used by the inventor is supplied at a concentration of approximately 30%, but may vary from about 20% by weight to about 40% by weight of hydrogen peroxide. No acidic or alkaline modification was made on the solution, leaving a non-alkaline solution. The concentrated hydrogen peroxide solution preferably has a pH between about 4.5 and about 5.0 (per US Peroxide).

The solution of hydrogen peroxide is heated to a temperature from about 30° C. to not greater than 80° C., preferably between about 60° C. and less than or equal to 80° C., and the filters are individually added. In one embodiment, the solution did not exceed the upper temperature limit of 80° C. The filters are immersed into the heated non-alkaline solution of concentrated hydrogen peroxide for at least 10 minutes, preferably between about 10 to about 20 minutes.

The filters are removed from the heated non-alkaline solution of concentrated hydrogen peroxide and rinsed with a deionized water solution at room temperature. Preferably, the filters are rinsed by immersing the filters into the deionized water solution. The rinsed filters are removed from the deionized water solution and dried, preferably within a particulate and contaminant free area to avoid picking up any unwanted particulates or contaminants.

Importantly, the process of the present invention can remove at least 80% and more typically over 90% of the chromium originally present in the polyvinyl chloride filters in a single treatment.

Figure 1:
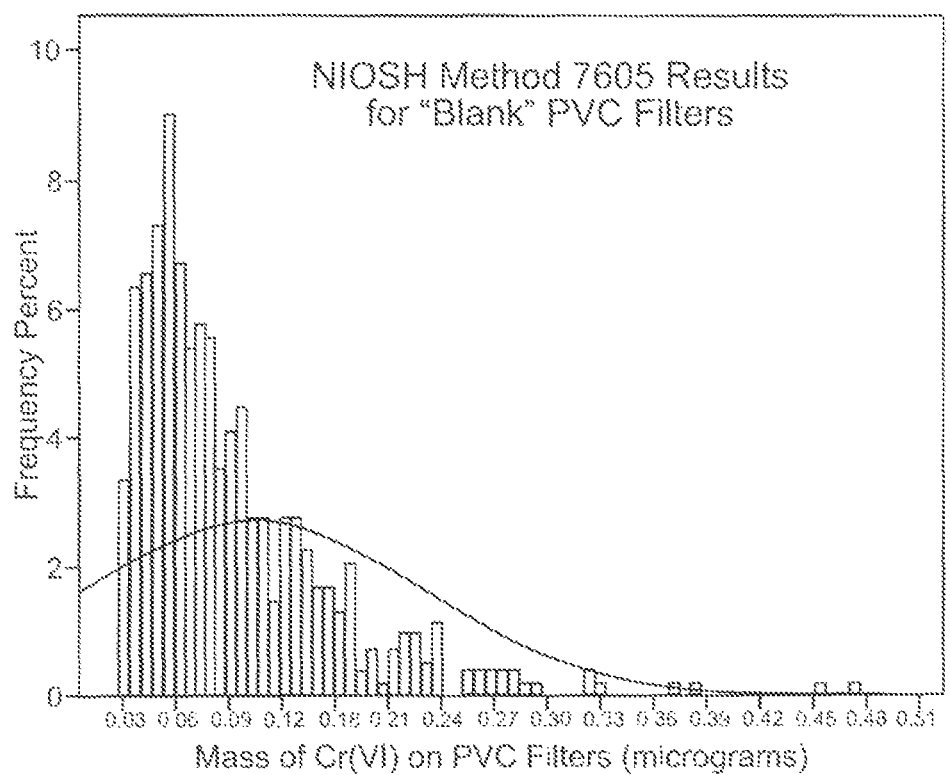
FIG. 1 illustrates the hexavalent chromium found on commercially available polyvinyl chloride (PVC) membrane filters.

The United States Air Force School of Aerospace Medicine (USAFSAM) occupational health laboratory, measured the amount of hexavalent chromium found on polyvinyl chloride (PVC) membrane filters using NIOSH Method 7605. FIG. 1 illustrates the hexavalent chromium found on commercially available polyvinyl chloride membrane filters as observed by The United States Air Force School of Aerospace Medicine occupational health laboratory investigations using National Institute for Occupational Safety and Health (NIOSH) Method 7605. The hexavalent chromium present in the polyvinyl chloride membrane filters interferes with examination of the chromium present in the workplace with available methodologies. This is because the current analytical analysis methods lack the ability to discern environmentally harvested chromium materials from chromium present in the polyvinyl chloride filter as a result of manufacturing byproducts.

Since the presence of hexavalent chromium (as detected by NIOSH Method 7605) appears to be random, the industry has been confused about the occurrence of the background chromium present within the filter. The inventor's first experiment conclusively determined that the chromium was definitely present within the filter by digesting varying amounts of filters and examining for total chromium by EPA Method 6020. [Test Methods for Evaluating Solid Waste, Physical/Chemical Methods, 3$^{rd}$ Edition, EPA Method 6020]

The results in the Table below clearly indicate that the chromium present was linked to its presence in the filter.

| Digestion of PVC Filters and Analysis by EPA Method 6020 | |
| --- | --- |
| Quantity of Filters | Concentration (μg micrograms/set) |
| 1 | 0.325 |
| 2 | 0.70 |
| 3 | 1.125 |
| 4 | 1.275 |

The data illustrates an almost linear relationship between the number of filters and concentration of chromium present. The greater the quantity of filters digested, the greater the concentration of chromium present. The data demonstrates that the chromium is definitely present within the polyvinyl chloride filters The next experiment was to determine the effects of hydrogen peroxide on the polyvinyl chloride filters. Three points were examined: an untreated filter, a filter at room temperature (app. 20 deg C.) and a filter treated at 80 deg C. The filters treated with hydrogen peroxide were immersed in a 30% hydrogen peroxide solution for approximately ten minutes at varied temperatures and then removed with non-metallic tweezers. The filters were then washed in distilled water and allowed to air dry. The filters were analyzed using EPA Method 6020 and the results are listed below.

| Analysis of PVC Filters Treated with Hydrogen Peroxide | |
| --- | --- |
| Treatment | Result (μg Chromium/Filter) |
| None | 0.38 |
| Hydrogen Peroxide @ Room Temp. | 0.23 |
| Hydrogen Peroxide @ 80 deg C. | 0.028 |

While there may be some conversion of chromium (III) to chromium (VI) even at room temperature, this may be resulting from chromium already present in the soluble Cr (VI) state. This data shows that very little if any chromium is removed when using a hydrogen peroxide solution at room temperature. In contrast, 93% of the chromium is removed in a single treatment at elevated temperatures. Based on this experiment, the inventor has determined that elevated heat is necessary and critical to remove chromium. 80 deg C. is the maximum temperature that can be safely exercised without deterioration of the membrane.

While the above data demonstrates that chromium can be removed from the PVC filters, an additional experiment was needed to examine if the filters were free of hexavalent chromium as both chromium metals and hexavalent chromium are known health hazards that need to be monitored in the workplace.

A similar experiment was conducted, but in this case, NIOSH Method 7605 was used to examine the filters for the presence of hexavalent chromium. [NIOSH Manual of Analytical Methods (NMAM) (3rd Supplement); NIOSH Publication No. 2003-154 (2003); NIOSH Method 7605—Hexavalent Chromium by Ion Chromatography (2003)].

The data is shown below.

| Examination of Filters BY NIOSH Method 7605 | |
|---|---|
| Prep Method | μg Cr-VI/Filter |
| Untreated Filter | 0.11 |
| H$_2$O$_2$ Washed Filter @ Room Temp. | 0.15 |
| H$_2$O$_2$ Washed Filter @ 80 deg C. | 0.01 |
| H$_2$O$_2$ Oxidized Filter @ 80 deg C.* | 0.47 |

*The oxidized filter was heated in a beaker and allowed to dry without washing

The hexavalent chromium concentration of the untreated filter and the filter processed by the hydrogen peroxide solution at room temperature were essentially the same. The difference can be attributed to the random distribution of Cr-VI as exhibited in FIG. 1. Significant removal (>93%) hexavalent chromium was observed in the washed filter at 80 deg C. The oxidized filter resembles the data when digested filters were observed by EPA Method 6020 (0.38 μg/Filter) as total chromium. Therefore, total chromium on the filter can be quantitatively converted to hexavalent chromium by hydrogen peroxide at elevated temperatures when observed by NIOSH 7605 (0.47 μg/Filter) within experimental error.

The conversion to the hexavalent state of chromium results in the soluble form of chromium which is easily removed from PVC.

Figure 2A:
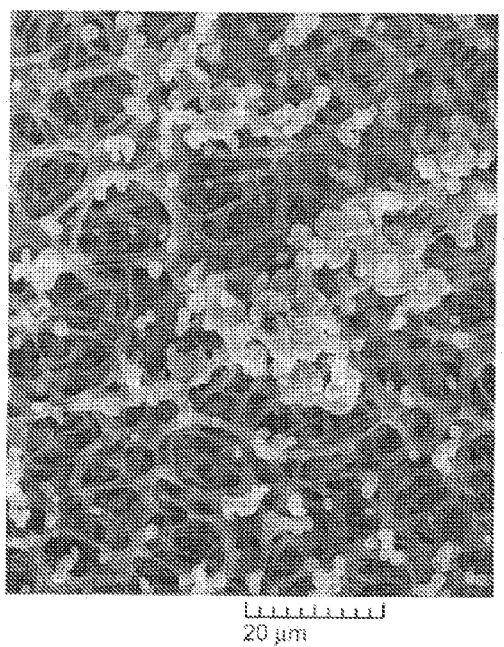
FIG. 2A is a "before" electron micrograph of a polyvinyl chloride (PVC) membrane filter.
Figure 2B:
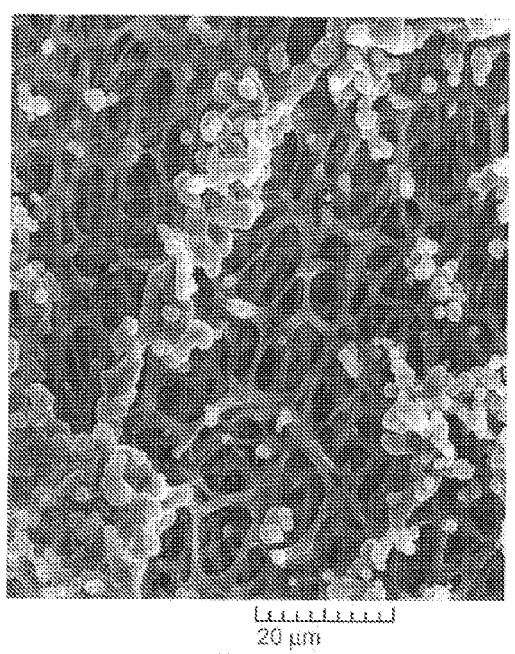
FIG. 2B is an "after" electron micrograph of a polyvinyl chloride PVC membrane filter illustrating no structural changes to the membrane structure.

Importantly, initial electron microscopy studies do not indicate any damage to the polyvinyl chloride membrane filter which appears to retain structural integrity. As shown in FIGS. 2A and 2B. FIG. 2A is a "before" electron micrograph of a PVC membrane filter, while FIG. 2B is an "after" electron micrograph of a PVC membrane filter illustrating no structural changes to the membrane structure.

The process of the present invention can also be used to remove chromium during the PVC polymer manufacturing process.

Having thus described exemplary embodiments of the present invention, it should be noted by those skilled in the art that the disclosures herein are exemplary only and that alternatives, adaptations and modifications may be made within the scope of the present invention.

What is claimed is:

1. A non-destructive process for the removal of chromium from polyvinyl chloride filters, said process comprising:
    a) providing a polyvinyl chloride filter and a non-alkaline solution of concentrated hydrogen peroxide;
    b) heating the non-alkaline solution of concentrated hydrogen peroxide to an elevated temperature from at least 30° C. to not greater than 80° C.;
    c) immersing the polyvinyl chloride filter into the non-alkaline solution of concentrated hydrogen peroxide at the elevated temperature for at least 10 minutes;
    d) removing the polyvinyl chloride filter from the non-alkaline solution of concentrated hydrogen peroxide; and
    e) rinsing the polyvinyl chloride filter with a deionized water solution.

2. The process of claim 1 wherein the non-alkaline solution of concentrated hydrogen peroxide in step b) is heated to a temperature of from about 60° C. to less than or equal to 80° C.

3. The process of claim 1 wherein the non-alkaline solution of concentrated hydrogen peroxide in step a) has a concentration of from about 20% by weight to about 40% by weight of hydrogen peroxide.

4. The process of claim 1 wherein the polyvinyl chloride filter is immersed in the non-alkaline solution of concentrated hydrogen peroxide at the elevated temperature in step c) for between 10 minutes and 20 minutes.

5. The process of claim 1 wherein the non-alkaline concentrated solution of hydrogen peroxide in step a) has a ph of from about 4.5 to about 5.0.

6. The process of claim 5 wherein the non-alkaline solution of concentrated hydrogen peroxide in step b) is heated to a temperature of from about 60° C. to less than or equal to 80° C.

7. The process of claim 6 wherein the non-alkaline solution of concentrated hydrogen peroxide in step a) has a concentration of from about 20% by weight to about 40% by weight of hydrogen peroxide.

8. The process of claim 7 wherein the polyvinyl chloride filter is immersed in the non-alkaline solution of concentrated hydrogen peroxide at the elevated temperature in step c) for between 10 minutes and 20 minutes.

9. The process of claim 1 wherein the polyvinyl chloride filter in step e) is rinsed by immersing the filter into the deionized water solution.

10. The process of claim 1 wherein in the polyvinylchloride filter in step e) is dried after being rinsed with the deionized water solution.

* * * * *